United States Patent [19]
Uehara et al.

[11] Patent Number: 4,736,357
[45] Date of Patent: Apr. 5, 1988

[54] RECORDING AND/OR REPRODUCING APPARATUS

[75] Inventors: Tsukasa Uehara, Tokyo; Masaya Maeda; Akimasa Nishimura, both of Kanagawa, all of Japan

[73] Assignee: Canon Kabushiki Kaisha, Tokyo, Japan

[21] Appl. No.: 777,229

[22] Filed: Sep. 18, 1985

[30] Foreign Application Priority Data

Sep. 19, 1984 [JP] Japan .................................. 59-196355

[51] Int. Cl.$^4$ ............................................. G11B 17/04
[52] U.S. Cl. ..................................... 369/270; 360/97; 360/133; 369/772
[58] Field of Search ....................... 369/77.1, 77.2, 36, 369/39, 270; 360/97, 133, 99

[56] References Cited

U.S. PATENT DOCUMENTS

| 4,445,157 | 4/1984 | Takahashi | 360/133 |
| 4,481,552 | 11/1984 | Dona et al. | 360/133 |
| 4,482,929 | 11/1984 | Beck et al. | 360/133 |
| 4,502,133 | 2/1985 | Siryj et al. | 369/36 |
| 4,504,936 | 3/1985 | Faber et al. | 369/36 |
| 4,602,306 | 7/1986 | Noda | 360/99 |

Primary Examiner—Steven L. Stephan
Attorney, Agent, or Firm—Toren, McGeady & Associates

[57] ABSTRACT

A recording and/or reproducing apparatus of the kind using a disc-shaped record bearing medium is provided with a stabilizer plate for stabilizing the rotation of the medium; a center core pressing device for pressing a center core which is secured to the medium against a rotatory drive part; and common support member for supporting both the stabilizer plate and the center core pressing device in common with each other, so that the stabilizer plate and the center core pressing device can be arranged in one unit.

13 Claims, 5 Drawing Sheets

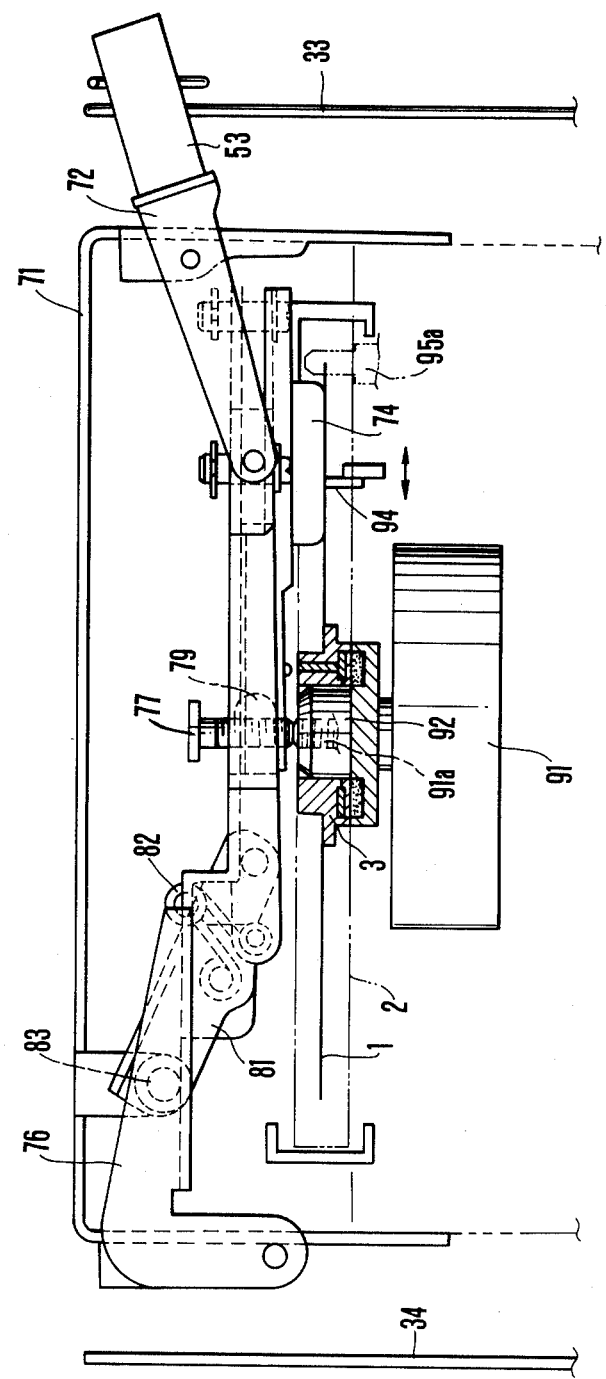

RECORDING AND/OR REPRODUCING APPARATUS

CROSS REFERENCE

Disclosed but not claimed is claimed in two copending patent applications of the same assignee, both entitled "Recording and/or Reproducing Apparatus" and filed on the same date as the present application.

BACKGROUND OF THE INVENTION

1. Field of the Invention

This invention relates to a recording and/or reproducing apparatus adapted for use of a disc-shaped record bearing medium, and more particularly to such arrangement of the apparatus that simplifies assembly work on a stabilizer plate and a center core pressing device.

2. Description of the Prior Art

In order to obtain good recording and/or reproducing characteristics of a recording and/or reproducing apparatus using, for example, a disc-shaped flexible record bearing medium such as a rotating magnetic disc (or a magnetic sheet), the medium must be coupled with a rotatory drive part without eccentricity and with a certain degree of durable rotatory precision. To meet this requirement, there have been proposed various devices for pressing or pushing a center core which is secured to the record bearing medium onto the rotatory drive part such as the spindle of a driving motor.

Further, it is also important for a recording and/or reproducing apparatus of this kind to keep the record bearing medium either in contact with or confronted with a recording or reproducing head across an air layer not exceeding, for example, 0.5 $\mu$m or thereabout. If this contact or confronted state is inadequate, a space loss occurs lowering the level of the recording or reproduction output of the apparatus. Therefore, the conventional recording and/or reproducing apparatus of the kind using a disc-shaped record bearing medium, such as a rotating magnetic disc, is arranged to better the contact or confronted state of the record bearing medium and the recording or reproducing head, for example, by arranging a stabilizer plate in such a way as to have the medium interposed in between the head and the stabilizer plate and thus to have it prevented from deforming while it is rotating. The stabilizer plate serves to bring about an air flow between the record bearing medium and the stabilizer plate. A balance between pressure developed by the air flow and the physical property of the record bearing medium is utilized for stabilization of the contact or confronted state between the medium and the head. In this arrangement, the position of the stabilizer plate relative to the medium or the head (including the relative planar position and height thereof) is a very important factor. Inaccuracy of this position hardly gives a stable contact or confronted state between the record bearing medium and the recording or reproducing head.

Since the center core pressing member and the stabilizer plate are to be disposed close to each other, they impose a considerable degree of limitation on spatial arrangement. Therefore, the operating arrangement for a center core pressing device and a stabilizer plate raising-and-lowering device tends to necessitate complex structural arrangement, which results in an increased size of the whole apparatus. This tendency is salient particularly in cases where these two devices are to be arranged in association with a record bearing medium loading device. Assembly work on them and ensuing adjustment work on them also become complex.

SUMMARY OF THE INVENTION

It is therefore an object of this invention to provide a novel recording and/or reproducing apparatus which is capable of eliminating the problem of the prior art.

It is another object of this invention to provide a recording and/or reproducing apparatus incorporating means for permitting unitized assembly work on stabilizing means and center core pressing means and thereby simplification of assembly work on the whole apparatus.

Under this object, according to an aspect of the invention, a recording and/or reproducing apparatus comprises: stabilizing means for stabilizing the rotation of a record bearing medium; center core pressing means for pressing a center core, which is secured to the record bearing medium, against a rotatory drive part; and support means arranged in common for supporting both the stabilizing means and the center core pressing means.

It is a further object of this invention to provide a recording and/or reproducing apparatus incorporating therein means for permitting head touch adjustment to be performed on the side of the body of the apparatus, for increasing the accuracy of a center core pressing position and for reducing the degree of variations in the pressing force.

Under that object, according to another aspect of the present invention, a recording and/or reproducing apparatus comprises: stabilizing means for stabilizing the rotation of a record bearing medium; center core pressing means for pressing a center core, which is secured to the record bearing medium, against a rotatory drive part; and common support means which is arranged on the side of the apparatus body to support both the stabilizing means and the center core pressing means.

The apparatus according to this invention is preferably provided with an operating device which is arranged in common for both the stabilizing means and the pressing means and to act on the above-stated common support means.

Further, the operating device can be arranged in association with the record bearing medum loading device of the apparatus.

The above and further objects, aspects and features of this invention will be apparent from the following detailed description of a preferred embodiment thereof taken in connection with the accompanying drawings.

BRIEF DESCRIPTION OF THE DRAWINGS

FIGS. 4A and 4B are sectional veiws showing the details of a stabilizer plate raising-and-lowering and center core pressing mechanism shown in FIG. 1 as in their varied states with the cassette in its raised and lowered positions.

DETAILED DESCRIPTION OF THE PREFERRED EMBODIMENT

The following describes an embodiment of this invention with a rotary magnetic recording disc employed as the record bearing medium. The description includes the arrangement of a cassette containing the medium and having a shutter; a shutter opening and closing mechanism; front and rear holder parts; a cassette loading mechanism; a stabilizer plate raising-and-lowering and center core pressing mechanism; and the operation of a recording and/or reproducing apparatus arranged as the preferred embodiment of this invention. This invention is not limited to the embodiment described herein but is also applicable to other varied types of recording and/or reproducing apparatuses including an optical type, an electrostatic capacity type and a type using a tape-shaped record bearing medium.

Figure 1:
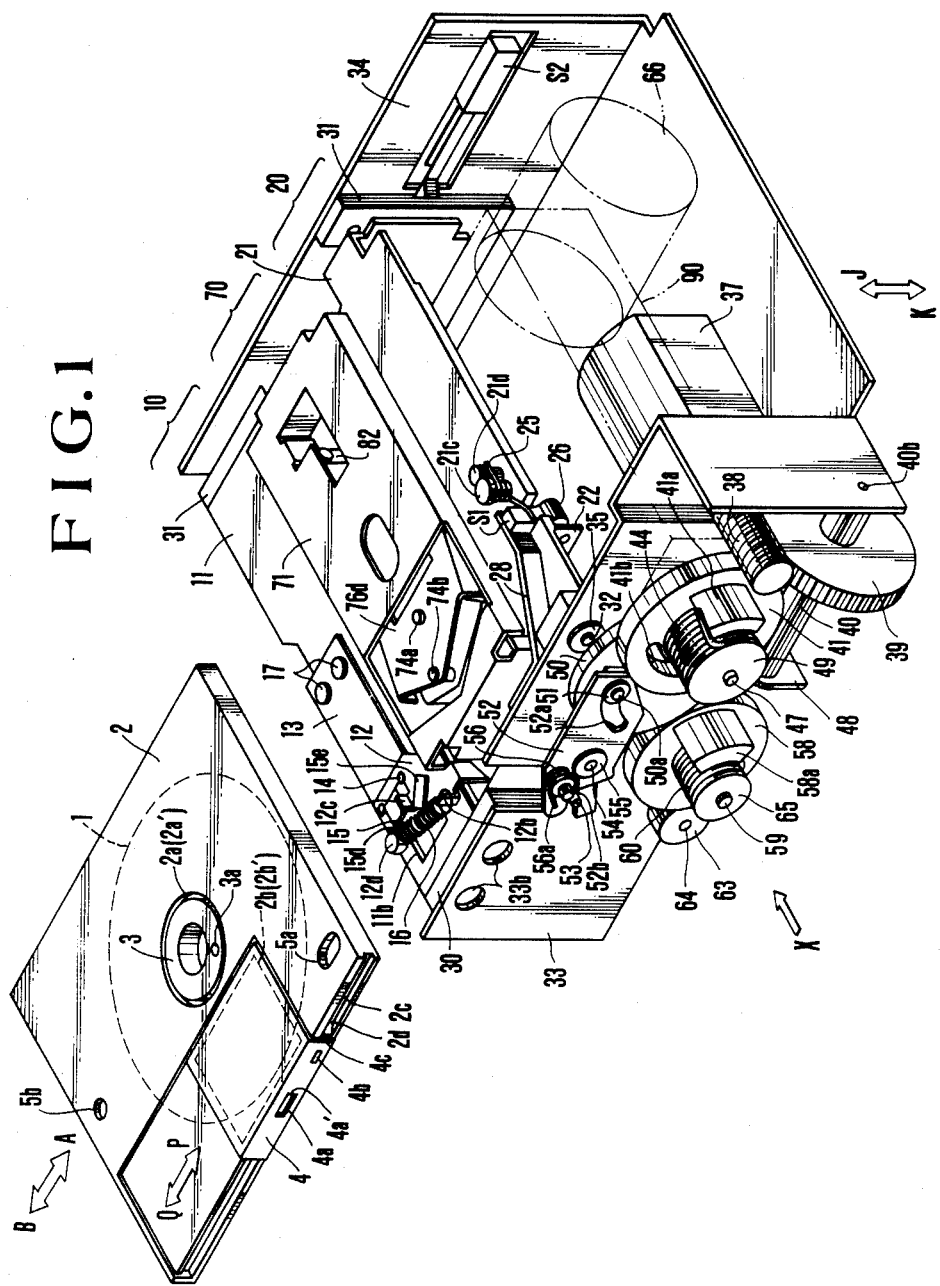
FIG. 1 is an oblique view showing the overall arrangement of a recording and/or reproducing apparatus arranged according to this invention as an embodiment thereof.

Arrangement of the cassette and the shutter (FIG. 1):

Referring to FIG. 1, a flexible magnetic disc 1 is used as an example of the disc-shaped record bearing medium usable according to this invention. A cassette 2 contains the magnetic recording disc 1. A center core 3, which is secured to the middle part of the magnetic disc 1, is made of a synthetic resin. A PG pin 3a which is provided for indicating the rotation phase of the disc 1, pierces the center core 3. The pin 3a will be further described later with reference to FIGS. 4A and 4B. A hole 2a is formed in the upper side of the cassette 2 in a position corresponding to the center core 3. A similar hole 2a' is formed also in the lower side of the cassette 2. A window 2b is provided in the upper side of the cassette 2 for allowing a stabilizer plate (74 of FIG. 4A) to enter the cassette 2. Another window 2b' is formed in the lower side of the cassette 2 in a position corresponding to the window 2b and is arranged to allow a magnetic head (94 of FIG. 4A) to enter the cassette 2. The stabilizer plate entering window 2b and the magnetic head entering window 2b' are arranged to be normally covered with a shutter 4 which is arranged to be movable in the directions of arrows P and Q. The shutter 4 is provided with a shutter closing hole 4a which is arranged to have a shutter closing claw (15c of FIG. 2) plunge thereinto and a locking claw 4b which is arranged to engage a shutter lock member 2d. Reference numeral 4a' denotes the end face of the hole 4a and another numeral 4c the end face of the shutter 4. A sliding slit 2c is provided in the side face of the cassette 2 for enabling the shutter closing claw 15c and a shutter opening claw 12a to be slidably fitted therein. The shutter lock member 2d, which is made of a plastic material, is disposed on one side face of the cassette 2. When the shutter 4 moves in the direction of arrow Q relative to the cassette 2, the windows 2b and 2b' for the stabilizer plate and the magnetic head are opened. These windows are closed when the shutter moves in the direction of arrow P.

A pair of positioning holes 5a and 5b are provided in the cassette 2 for use by the apparatus in positioning the cassette 2 at the time of loading. Both the positioning holes 5a and 5b pierce the upper and lower sides of the cassette 2. The hole 5a has an elliptical shape and is located on the same side as the shutter 4 relative to the direction of arrow A in which the cassette 2 is inserted and is located at a corner part on the upstream side of the shutter 4. The other hole 5b has a circular shape and is located in the middle of the rear part of the cassette 2 also relative to the direction of arrow A. In the case of this embodiment, the hole 5a also serves as an engaging part to engage an engaging member 26 which will be described later herein. However, in accordance with this invention, the engaging part may be arranged separately from the positioning hole 5a.

Figure 2:
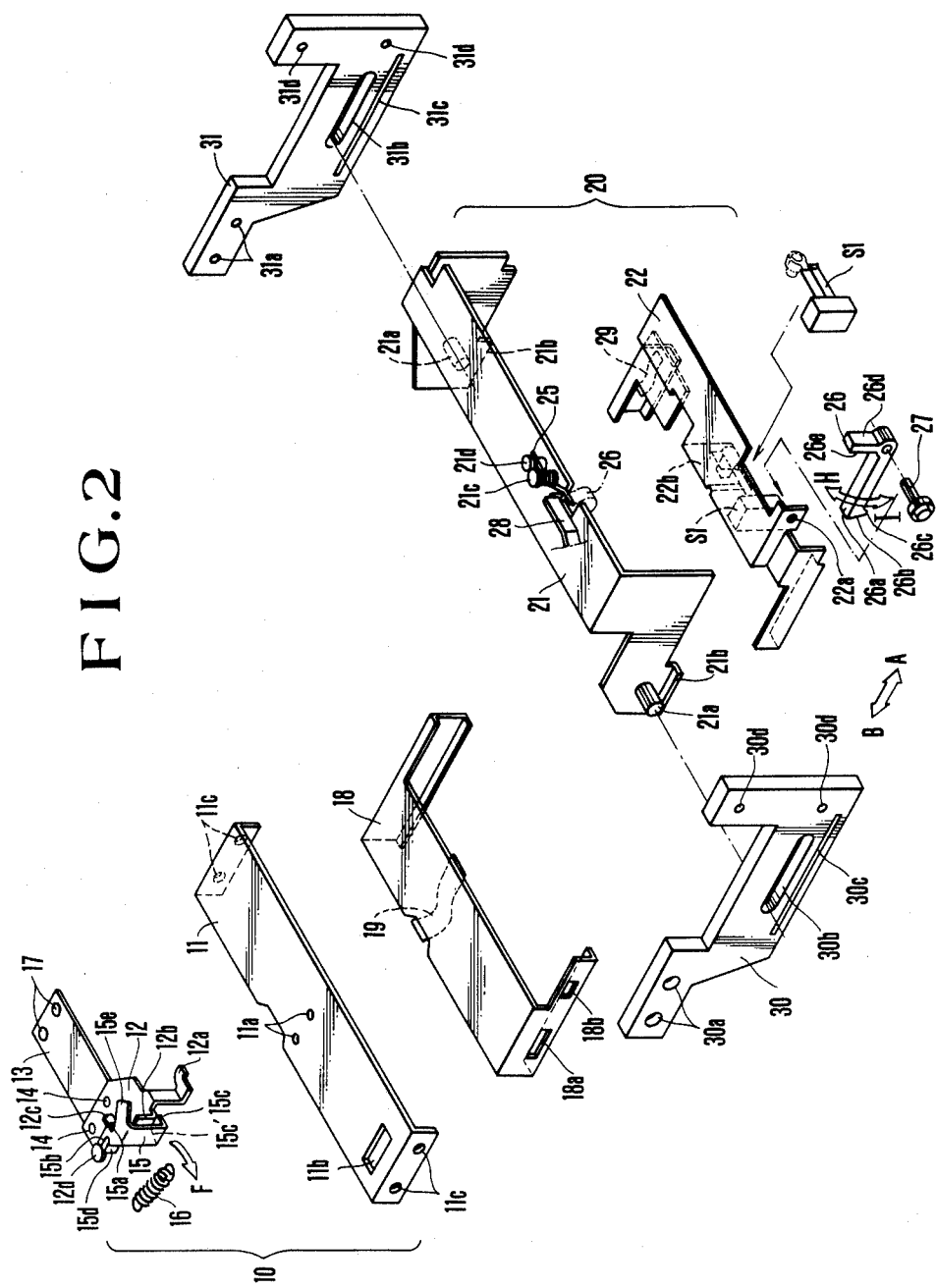
FIG. 2 is an exploded oblique view showing the details of a front holder part and a rear holder part included in the illustration of FIG. 1.

Shutter opening and closing mechanism (FIGS. 1 and 2):

Referring to FIGS. 1 and 2, a cassette holder part for holding the cassette 2 includes a front holder part 10 and a rear holder part 20, which are arranged separately from each other. The front holder part 10 includes a front half 11 and a front holder 18. On the upper surface of the front half 11 is disposed a shutter opening member 12. The member 12 is attached to a leaf spring 13 by means of pins 14 and is provided with an opening claw 12a which is arranged at a C-shaped bent part thereof to open the shutter 4. The shutter opening member 12 is further provided with a spring hook part 12b which is arranged at one end of the member 12 to hook one end of a spring 16. Pins 17 are arranged to secure the shutter opening member 12 at its tail end part to the front half 11 in such a way as to make it vertically swingable on the front half. A bent part 12c is arranged to rise from the flat surface of the shutter opening member 12 to engage with a cam part 15e of a shutter closing member 15 which will be described later. A guide pin 12d is erected on the shutter opening member 12 and is thus arranged to stabilize the movement of the shutter closing member 15.

The shutter closing member 15 is disposed on the shutter opening member 12 and is arranged as follows: An end face 15a of the shutter closing member 15 is arranged to abut on one end of the bent part 12c of the shutter opening member 12. A cam part 15e continues from the abutting end face. When the closing member 15 moves relative to the opening member 12, the cam part 15e comes to abut on one end of the bent part 12c of the shutter opening member 12. This causes the closing member 15 to turn in the direction of arrow F on the guide pin 12d. The guide pin 12d has a slot 15b of the closing member 15 fittingly engaged therewith. A closing claw 15e is arranged at a C-shaped bent part of the shutter closing member 15 to close the shutter 4. A spring hook part 15d is provided at one end of the shutter closing member 15. The spring 16 is arranged between the spring hook part 15d and the spring hook part 12b of the shutter opening member 12. The spring 16 is thus arranged to urge the shutter closing member 15 to turn counterclockwise on the guide pin 12d.

The closing claw 15c of the shutter closing member 15 is arranged to plunge into the closing hole 4a of the shutter 4 shown in FIG. 1. The shutter opening claw 12a opens the shutter 4 when the cassette 2 is inserted in the direction of arrow A. Then, the shutter closing claw 15c falls into the hole 4a. When the cassette 2 is taken out in the direction of arrow B, the shutter 4 is closed by means of the claw 15c which is in the hole 4a. To enable the closing claw 15c to easily ride across the edge face 4c of the shutter 4, the claw 15c is provided with a tapered part 15c'.

Front holder and rear holder parts (FIGS. 1 and 2):

The details of the cassette holder parts mentioned in the foregoing are as follows: In the front holder part 10, the front half 11 is arranged to carry the front holder 18 with the latter secured to the former by means of screws or the like which are not shown. The leaf spring 13 is secured to and carried by the front half 11 by means of pins 17, which are caulked at caulking holes 11a. A slot 11b is formed in the front half 11. The vertical part of the cassette closing member 15 is inserted through this slot 11b. Screw holes 11c are provided in the front half 11 for connecting a guide 30 to the front half 11 by means of screws. The front half 11 is thus secured to the guide 30 via facing holes 30a. Another pair of screw holes 11c are symmetrically arranged on the opposite side of the front half 11. A guide 31 on the opposite side and the front half 11 are thus connected to each other also via facing holes 31a provided in the guide 31. In other words, the front half 11 and the guides 30 and 31 are thus arranged to operate in one unified body. A leaf spring 19 is arranged at the ceiling of the front holder 18 to press the cassette 2. The front holder 18 is provided with holes or slots 18a and 18b formed in one side wall of the front holder. The slot 18a serves as an escape hole for the closing claw 15c and the other slot 18b as an escape hole for the opening claw 12a.

In the rear holder part 20, a rear half 21 carries a rear holder 22. The rear holder 22 is attached to the rear half 21 by means of screws or the like. Pins 21a are provided on both sides of the rear half 21 as shown in FIG. 2. These pins 21a are respectively fitted in the slots 31b and 31b provided in the guides 30 and 31. By virtue of this arrangement, the rear half 21 is movable in the directions of arrows A and B along the slots 30b and 31b. The rear half 21 is provided with bent parts 21b which are symmetrically formed on both sides of the rear half 21. These bent parts 21b fit in slits 30c and 31c which are formed in the guides 30 and 31. This prevents the rear half 21 from turning on the pins 21a and, at the same time, allows the rear half 21 to move in the directions of arrows A and B.

Reference numerals 26 and 28 denote an engaging member and a disengaging member, respectively. The engaging member 26 is arranged to engage with the positioning hole 5a of the cassette 2 and, for the reason described hereinafter, has an end part 26a, a tapered part 26b and engaging part 26c thereof preferably either entirely or partially made of a plastic material. A shaft 27 is arranged to pivotally carry the engaging member 26 to permit it to turn in the direction of arrows H and I as shown in FIG. 2. The shaft 27 is secured to the holding part 22a of the rear holder 22 by caulking or the like. The drawing shows a spring 25 as means for urging the engaging member 26 to turn in the direction of arrow I toward the positioning hole 5a. The spring 25 is carried by a shaft 21c and has its rear end attached to a stud 21d. The fore end of the spring 25 is arranged to push the side face 26d of the engaging member. The disengaging member 28 is secured, for example, to a side chassis 33 and is arranged to abut on another side face 26e of the engaging member 26 which is located on the side opposite to the side face 26d while the cassette 2 is not inserted into the apparatus. Under that condition, the spring 25 is prevented from turning the engaging member 26 in the direction of arrow I indicated in FIG. 2. If the engaging member 26 itself is made of some elastic material such as a leaf spring and is arranged to have its bent part engageable with the positioning hole 5a, the engaging member 26 can be urged toward the positioning hole 5a without recourse to the use of the spring 25, etc. In that case, the disengaging member 28 may be arranged to act on this bent part to control the engagement of the bent part with the hole 5a.

A leaf spring 29 is arranged to press the cassette 2 while the rear holder 22 is provided with an abutting part 22b. With the abutting part 22b pushed by the cassette 2 when the cassette is inserted, the rear holder 22 slides in the direction of arrow A along the slots 30b and 31b of the guides 30 and 31. A shaft 32 is carried by holes 30d and 31d which are provided in these guides 30 and 31. While the front holder part 10 is arranged to be movable together with the guides 30 and 31 in one unified body with them, the rear holder part 20 is arranged to be movable relative to the guides 30 and 31 along the slots 30b and 31b in the directions of arrows A and B as mentioned above.

A switch S1 is arranged to detect the insertion of the cassette 2. Another switch S2 is arranged in combination with the switch S1. In the case of this specific embodiment, the switch S1 is disposed in a position to operate when the cassette 2 is inserted into the apparatus and comes to abut on the abutting part 22b of the rear holder 22. The switch S2 is disposed in a position to operate when the cassette 2 is further inserted to come to a state as shown in FIG. 3B.

Figure 3A:
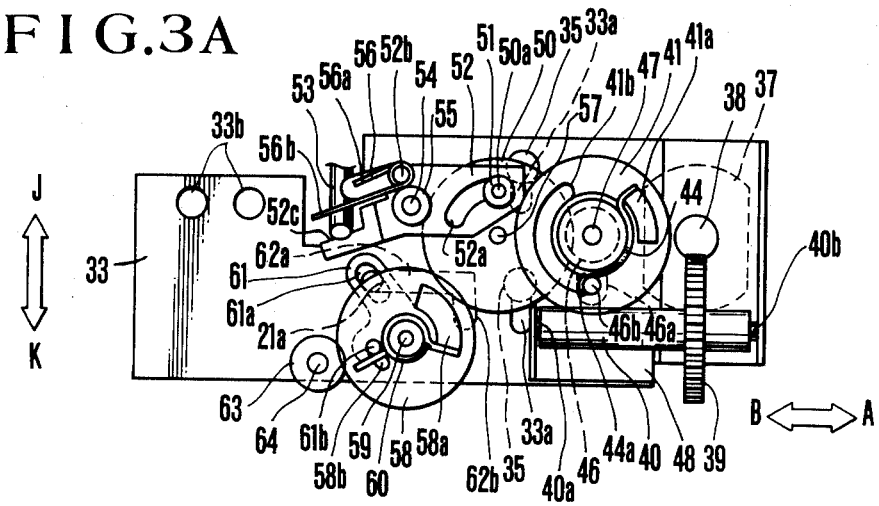
FIGS. 3A, 3B and 3C are side views showing a gear train as in different states as viewed from the direction of arrow X indicated in FIG. 1, FIG. 3A showing it as in a state before insertion of a cassette, in a state at the start of a loading switch operation and FIG. 3C as in a state at the end of cassette loading.
Figure 3B:
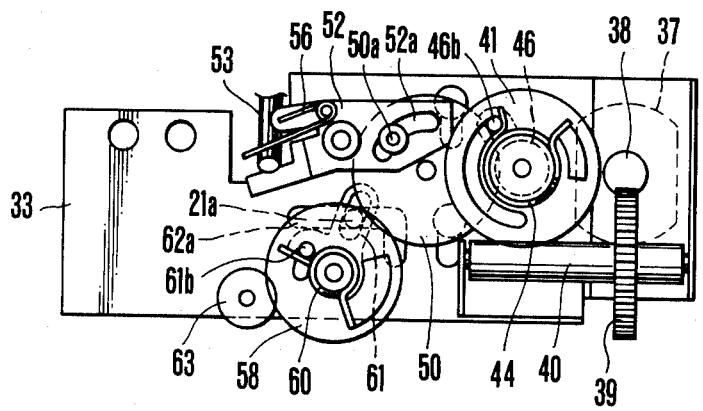
Figure 3C:
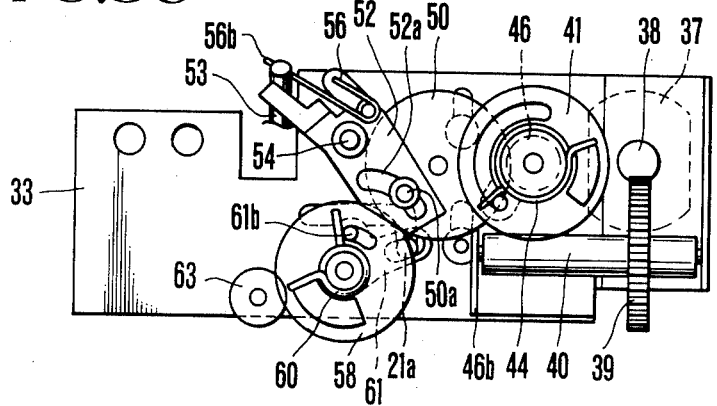

Cassette loading mechanism (FIGS. 1 and 3A–3C):

FIGS. 3A, 3B and 3C are side views of the embodiment as viewed in the direction of arrow X indicated in FIG. 1. These drawings show the various states of the cassette loading mechanism of the embodiment of this invention and particularly the movement of a gear train during a cassette loading operation. FIG. 3A shows the mechanism before loading; FIG. 3B the state of the mechanism at the beginning of the operation of the loading switch S2 (FIG. 1) after cassette insertion; and FIG. 3C the state of the mechanism at the time of completion of the loading operation.

The shafts 32 (FIG. 1) are carried by the holes 30d and 31d which are provided in the guides 30 and 31, two in each of the guides. Two slots 33a are formed in each of the side chassis 33 and a sub-chassis 34 (only the two on the side of the side chassis 33 are shown in FIGS. 3A, 3B and 3C). The shafts 32 are fitted into these slots 33a via rollers 35 (only two of them on the side of the side chassis 33 are shown in FIGS. 3A, 3B and 3C). This arrangement enables the guides 30 and 31 to move in the longitudinal direction of the slots 33a. In other words, they are movable in the directions in which the cassette 2 ascends and descends. Although the side chassis 33 and the sub-chassis 34 are shown as being in one unified body in the drawing, they are preferably arranged to be separable to facilitate the precise mounting work such as caulking on the shafts of the gear train which will be described later. The separable arrangement of these chassis thus facilitates whole assembly work.

The illustration of FIGS. 3A–3C also includes a loading motor 37; a worm gear 38 which is mounted on the output shaft of the motor 37; a worm wheel 39; a worm gear 40 which is arranged to turn together with the worm wheel 39; and another worm wheel 41. The worm wheel 41 is provided with a raised part 41a, which is arranged to charge a spring 44, and a thorough slot 41b which is formed in an arcuate shape encircling a shaft 47. A spur gear 46 is disposed on the reverse side of the wheel 41 and is arranged to turn on the shaft 47. A tongue-shaped part 46a of the gear 46 has a pin 46b erected thereon. The pin 46b pierces the slot 41b to have one end of the spring 44 attached thereto. Since the worm wheel 41 and the spur gear 46 are separated from each other, the rotating drive force of the motor 37 is transmitted to the spur gear 46 via the pin 46b. During the rotation of the worm wheel 41, a force develops in the direction of thrust. Therefore, a keep plate 49 (FIG. 1) is arranged to retain the worm wheel 41. A bearing 48 is arranged to pivotally carry the shaft end 40a of the worm gear 40. The other shaft end 40b of the worm gear 40 is carried by the sub-chassis 33.

Figure 4A:
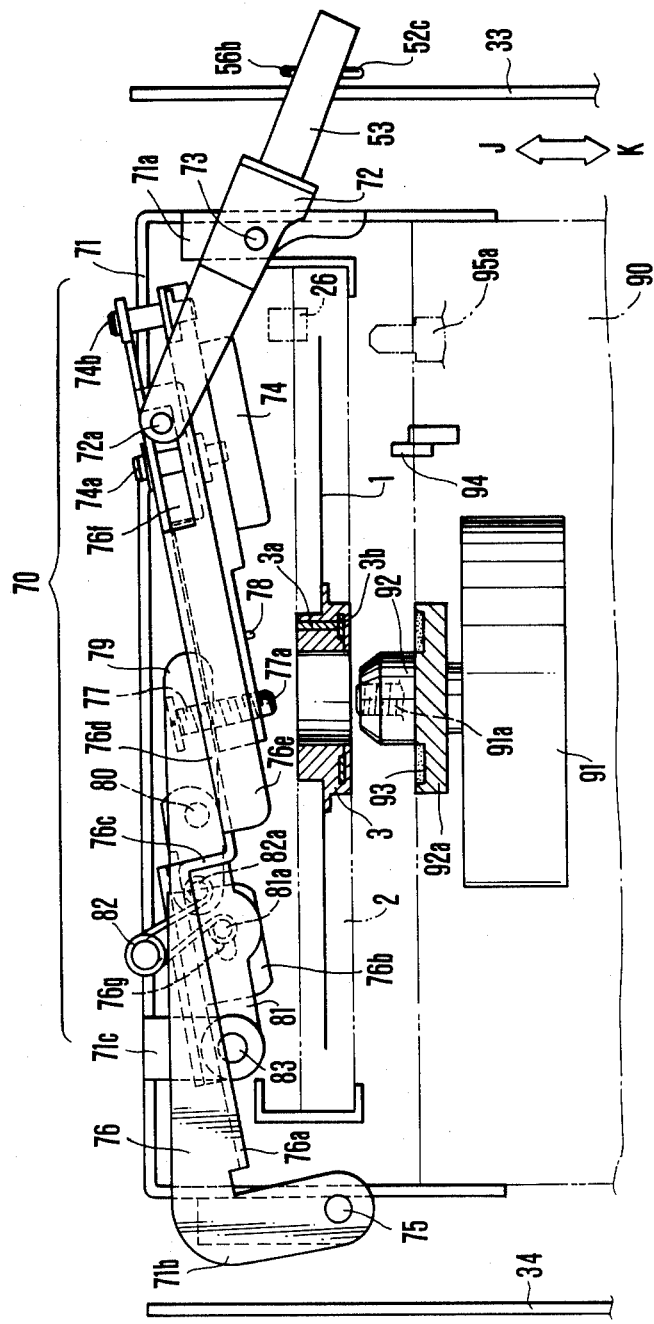

A spur gear 50 is arranged to engage the spur gear 46 and to turn on a shaft 57. A pin 50a is erected on the gear 50. The pin 50a pivotally carries a roller 51 which fittingly engages a cam slot 52a which is provided in a lever 52. The lever 52 is arranged to actuate a lever 53 which causes the ascent and descent of a stabilizer plate 74 (FIG. 4A). The illustration further includes the shaft 54 of the lever 52; a washer plate 55; a pin 52b which is erected on the lever 52 and is arranged to pivotally carry a spring 56 one end 56a of which is secured to the lever 52 while the other end 56b is arranged to urge the end part 52c of the lever 52; and another spur gear 58 which is arranged to engage the spur gear 50 and to turn on a shaft 59. The flat gear 58 is provided with a raised part 58a, which is arranged to charge a spring 60, and a thorough slot 58b which is formed in an arcuate shape encircling the shaft 59. A lever 61 is arranged to turn on the shaft 59 of the spur gear 58. The lever 61 is provided with a slot 61a, which is arranged to fittingly engage a pin 21a erected on the rear half 21, and a pin 61b which pierces the slot 58b extending toward the surface of the paper of the drawing of FIG. 3A. The pin 61b is urged by the spring 60 to move clockwise. As shown in FIG. 3A, the side chassis 33 is provided with a slot consisting of a horizontally extending part 62a and a vertically extending part 62b. When the spur gear 58 rotates, a rotating driving force is transmitted via the spring 60 to the pin 61b. This causes the lever 61 to turn. The pin 21a, which is erected on the rear half 21, moves in the direction of arrow A or B along the slot part 62a and also in the direction of arrow J or K (ascending or descending direction of the cassette 2) along the other slot part 62b.

With the embodiment arranged as described above, the rear holder part 20 is movable in the directions of arrows A and B and also in the directions of arrows J and K. Meanwhile, the front holder part 10 and the guides 30 and 31 are movable only in the directions of arrows J and K. Another set of the members and parts from the spur gear 58 to the slot parts 62a and 62b are arranged on the risen parts of the sub-chassis 34 on the opposite side in a symmetrical manner. The shaft 64 of the spur gear 63 which engages with the flat gear 58 extends toward the sub-shassis 34 to transmit the driving force of the loading motor 37 to the members on the side of the sub-chassis 34. The illustration further includes a washer plate 65; a stepping motor 66 which is arranged to move a recording and/or reproducing head 94 (FIG. 4A) in the radial direction of the magnetic disc 1; and two holes 33b provided in the side chassis 33 (similar holes are symmetrically provided also in the sub-chassis 34). These holes are arranged to permit insertion of screw drivers through them at the last step of assembly work for fixing the front holder part 10 and the guides 30 and 31 in positions.

Stabilizer plate raising-and-lowering and center core pressing mechanism (FIGS. 1, 3A–3C and 4A and 4B):

FIGS. 4A and 4B show the stabilizer plate raising-and-lowering and center core pressing mechanism of the embodiment of this invention as viewed in the direction of arrow A indicated in FIG. 1, FIG. 4A showing the cassette 2 as in its raised position and FIG. 4B showing it as in its lowered position. A reference numeral 74 denotes a stabilizer plate. Another numeral 79 denotes a center core pressing member. Referring to FIGS. 1, 4A and 4B, a reference numeral 70 denotes the stabilizer plate raising-and-lowering and center core pressing mechanism. A frame 71 is arranged to have the mechanism 70 mounted thereon. A reference numeral 90 denotes the body of the apparatus. A disc rotating motor 91 shown in FIG. 4A is of the outer rotor type. The motor 91 includes a fixed shaft 91a which is disposed in the middle thereof; and a receiving part which is arranged at the fore end thereof to receive the abutting part 77a formed at the fore end of a screw 77. In FIG. 4A, a positioning pin 95a is shown as arranged to cooperate with the positioning hole 5a in positioning the cassette 2. However, another positioning pin for the other positioning hole 5b is omitted from the drawing. The frame 71 is secured to the apparatus body 90. In this specific example of the embodiment, all the arrangements and members participating in the pressing or pushing operation on the center core 3 and the vertical moving operation on the stabilizer plate 74 are mounted on the frame 71. A lever 72 is pivotally supported via a shaft 73 by a bent part 71a of the frame 71. The lever 72 is provided with a pin 72a which is erected on the fore end part of the lever 72 and a stabilizer plate moving lever 53 which is erected on the rear end part thereof. The lever 72 is urged to turn on a shaft 73 by one end 56b of the spring 56.

The stabilizer plate 74 is provided for the purpose of stabilizing the rotation of the magnetic disc 1 by keeping the head 94 and the disc 1 in satisfactory contact with each other or by keeping them confronting each other across an air layer of thickness not exceeding 0.5 μm (for example) or thereabout under a recording or reproducing condition. Although it is not shown in the drawing, another stabilizer plate may be arranged beneath the magnetic disc 1. The plate 74 is provided with pins 74a and 74b. These pins are arranged to be used for hanging the stabilizer plate 74 by means of a lever 76 which will be described later. A conical coiled spring (not shown) is interposed in between the lever 76 and the stabilizer plate 74. The stabilizer plate 74 is thus always urged in the direction of arrow K in telation to the lever 76 as shown in FIG. 4A.

The lever 76 is pivotally supported by a bent part 71b of the frame 71 and is in the following shape: The lever 76 has a wide part which extends sidewise in the neighborhood of the shaft 75 in parallel with the paper surface of the drawing. The wide part extends upward to a certain extent and then perpendicularly bends. On the lower side of the bent part, a portion 76a extends from the paper surface side of the drawing to the back surface side of the paper. Then, on the back side, a part of the lever 76 bends downward to form a part 76b. Another part 76d comes via a stepped part 76c to extend from the paper surface side to the back surface side. A part 76e of the lever is arranged to extend downward on the paper surface side of the drawing as viewed on FIG. 4A. A slot 76f is formed in the part 76e of the lever 76. The pin 72a fittingly engages with the slot 76f. A screw 77 is threaded and has its fore end abutting part 77a arranged to abut on the fore end of the central fixed shaft 91a of the motor 91 thus permitting adjustment of the height of the stabilizer plate 74. The apparatus body 90 is provided with two receiving parts which are not shown but are arranged to receive the stabilizer plate 74 when the plate comes down. The urging force exerted on the stabilizer plate in the direction of arrow K is arranged to be sustained by three parts including these receiving parts and the fore end of the central fixed shaft 91a of the motor 91. A numeral 78 denotes one end of a PG yoke having a PG coil which is wound around the yoke.

A center core pressing member 79 is provided for the purpose of having the center core 3 accurately fitted on a spindle 92. The member 79 is forked in such a way not to overlap the spindle 92 and is pivotally supported by a shaft 80 on a lever 81 which will be described later. One end 82a of a toggle spring 82 is connected to the pressing member 79. The other end of the toggle spring 82 is connected to a pin 81a which is erected on the lever 81. The pin 81a is fitted into the slot 76g formed in the lever 76. The lever 81 is pivotally supported by the bent part 71c of the frame 71 via a shaft 83.

In FIG. 4A, a numeral 3a denotes the above-stated PG pin. The pin 3a is secured by planting or the like to a ring 3b which is made of a magnetizable material and is secured to the center core 3. The spindle 92 is provided with a flange part 92a. A permanent magnet 93 is attached to the flange part 92a. The magnetic flux of the permanent magnet 93 passes through the ring 3b and the PG pin 3a to produce a leakage magnetic flux to the outside of the center core 3. The magnetic flux flowing to the PG yoke 78 reaches a maximum value when the PG pin 3a comes to a point opposite to the PG yoke 78 with the center core 3 rotated. The magnetic flux decreases accordingly as the PG pin 3a moves away. By this, a voltage which varies with time is developed at the coil wound on the PG yoke 78, so that the rotation phase of the magnetic disc 1 can be detected through this voltage. Further, it is possible to arrange the spindle 92 to be mechanically coupled with the center core 3 by virtue of the magnetic action of the permanent magnet 93 and the ring 3b.

The operation of a recording and/or reproducing apparatus embodying this invention (FIGS. 1-4B):

A recording and/or reproducing apparatus embodying the arrangement of this invention as shown in FIGS. 1 to 4B operates as described below. The description will be made in the order of a cassette loading operation and the shutter opening and closing operation in association therewith; the ascent and descent of the stabilizer plate and the center core pressing operation; and an unloading operation.

When the operator manually inserts the cassette 2 into the cassette holder, the cassette 2 first comes into contact with the abutting part 22b of the rear holder 22 (FIG. 2). The cassette 2 is pushed further in the direction of arrow A. This causes the whole rear holder part 20 to be pushed in the direction of arrow A. The cassette insertion detection switch S1 comes to operate under this condition. With the rear holder part 20 thus moved, the lever 61 is caused via the pin 21a to turn clockwise. Then, the pin 61b erected on the lever 61 causes the gear 58 to turn clockwise. The spur gear 50 which is engaging the gear 58 turns counterclockwise. The gear 46 which is engaging the spur gear 50 turns clockwise. Meanwhile, the worm wheel 41 which is disposed on the front side of the gear 46 does not turn. Therefore, the pin 46b which is disposed on the tongue shaped part 46a of the gear 46 charges the spring 44 while turning clockwise along the slot 41b provided in the wheel 41. The counterclockwise turn of the gear 50 on the other hand causes the pin 50a which is provided on the spur gear 50 to move counterclockwise. During this process, however, the lever 52 does not turn on the shaft 54 because of the shape of the cam slot 52a provided in the lever 52.

FIG. 3B shows the gear train, etc. mentioned above as in their rotated state obtained as a result of the manual insertion of the cassette 2. Under this condition, the cassette loading switch S2 which is shown in FIG. 1 is operated by the shoulder part of the rear half 21. In response to the operation of the switch S2, the loading motor 37 begins to rotate in the loading direction. Then, if the operator removes his or her hand from the cassette 2 before there obtains the condition of FIG. 3B, the returning force of the spring 44 brings the pins 46b and 21a back to their positions of FIG. 3A and the cassette 2 is then ejected or discharged to the outside. Loading begins when there obtains the condition of FIG. 3B. The rotatory driving force of the loading motor 37 is transmitted to the worm gear 38, worm wheel 39, worm gear 40 and worm wheel 41. The worm wheel 41 turns clockwise. When the worm wheel 41 turns to a degree corresponding to the length of the slot 41b, the pin 46b and, accordingly, the gear 46 turns clockwise. The spur gear 50 turns counterclockwise. The gear 58 turns clockwise. Further, the spring 60 causes, via the pin 61b, the lever 61 to turn clockwise. As a result of that, each of the pins 21a, which is fitted in the slot 61a, moves in the direction of arrow A along the slot 62a of the side chassis 33 or the similar slot provided in the sub-chassis 34. The rear holder part 20 is thus caused to move in the direction of arrow A by the driving force of the loading motor 37. Then, the cassette 2 is pulled further into the front holder 18.

The operations of the engaging member 26 and the disengaging member 28 are as follows: When the cassette 2 is not inserted as shown in FIGS. 1 and 3A, the rear holder part 20 is urged by the urging force of the spring 44 which is exerted in the direction of arrow B as indicated in FIG. 3A. This is because the urging force of the spring 44 is urging the pin 21a to move toward the left end of the slot 62a via the engagement among the gear train 46, 50 and 58. Under this condition, the engaging member 26 abuts on the disengaging member 28 and is in a position to which it has been brought by the disengaging member 28 turning on the shaft 27 in the direction of arrow H. With the engaging member 26 in this position, the cassette 2 can be inserted in a direction from the paper surface to the reverse side of the paper as viewed in FIG. 4A. In case where there is room in the height of the apparatus, the end part 26a of the engaging member 26 may be arranged to be located beneath the stabilizer plate 74 leaving some clearance to have it not in contact with the plate 74. In the case of an apparatus of the kind arranged to have the cassette 2 loaded from the front and particularly in the case of a recording and/or reproducing apparatus of the kind using a still video cassette as in the case of this specific embodiment of the invention, the stabilizer plate raising-and-lowering and center core pressing mechanism 70 inevitably comes to have the largest height within the apparatus. Therefore, an arrangement to reduce the height of this part contributes to a reduction in the thickness of the whole apparatus. In view of this, in this specific embodiment, the tapered fore end part 26b of the engaging member 26 is arranged to overlap, to a slight extent, the cassette 2 in the direction of the thickness of the cassette 2. When the cassette 2 is inserted under this condition, the tapered part 26b is pushed by the end face of the cassette 2. Then, the engaging member 26 turns further in the direction of arrow H against the urging force of the spring 25 which is exerted on the side face of the engaging member 26. The end part 26a of the member 26 comes into contact with the stabilizer plate 74 and thus pushes the stabilizer plate 74, to a slight extent, upward in the direction of arrow J as indicated in FIG. 4A. This movement is then absorbed by a play or the like left between the pin 72a of the fore end of the lever 72 and the slot 76f of the lever 76 within the mechanism 70. The engaging member 26, or at least a part of it, is preferably made of a plastic material for the following reason: If the engaging member 26 is made of a metal or the like, the lower surface of the stabilizer plate 74 and a part of the cassette 2 around the positioning hole 5a would be damaged. Then, such damage might come to hinder normal recording or reproduction. Whereas, the use of a plastic material for the engaging member never causes such an inconvenience.

With the cassette 2 inserted, when it pushes the abutting part 22b of the rear holder 22, the whole rear holder part 20 is moved in the direction of arrow A. The engaging member 26 then moves away from the disengaging member 28. The urging force of the spring 25 causes the engaging member 26 to turn in the direction of arrow I. The engaging part 26c of the member 26 then comes to engage with the positioning hole 5a of the cassette 2. In this instance, with the tapered part 26b, the shape of the engaging part 26c and the position of the spring 29 suitably arranged, even a small urging force of the spring 25 gives a sufficiently large force for pulling the cassette 2 in the direction of arrow A via engagement with the engaging member 26. Therefore, the cassette loading operation can be accurately accomplished.

In pulling out the cassette 2 on the other hand, the disengaging member 28 again abuts on the engaging member 26 when the rear holder part 20 which carries the cassette 2 comes back to the disengaging member 28. The engaging member 26 then turns in the direction of arrow H against the urging force of the spring 25. This causes the engaging part 26c of the engaging member 26 to move away from the positioning hole 5a to permit the cassette 2 to be pulled out further in the direction of arrow B indicated in FIG. 2.

In accordance with the arrangement described, therefore, the cassette 2 can be engaged with and disengaged from the cassette holder part without fail by virtue of the engaging member 26, the spring 25 and the disengaging member 28. Unlike the conventional arrangement, the spring which is arranged within the cassette holder part to press and hold the cassette 2 does not have to have a large pressing force. Besides, the cassette 2 is never damaged by virtue of the arrangement described.

The above-stated arrangement for engaging and disengaging the record bearing medium container by means of the engaging member and the disengaging member is based on U.S. patent application by Uehara entitled "Recording and/or Reproducing Apparatus", assigned to the same assignee and filed on the same date as the present application. Meanwhile, the support means for supporting the stabilizer plate raising-and-lowering and center core pressing mechanism, which represents a main feature of the present invention, is applicable also to an apparatus having means for fixedly carrying a record bearing medium of a different kind from the one described in the foregoing.

When the motor 37 begins to perform the loading action, each of the pins 21a moves in the direction of arrow A along the slot 62a and then moves in the direction of arrow K along the slot 62b. The pins 21a pierce the slots 30b and 31b of the guides 30 and 31 while the bent parts 21b provided on both sides of the rear half 21 are fitted into the slits or slots 30c and 31c of the guides 30 and 31. Therefore, the guides 30 and 31 do not move when the pins 21a moves in the direction of arrow A. Further, when the pins 21a move in the direction of arrow K, the rollers 35, which fittingly engage the slots 33a provided in the side chassis 33 and similar slots provided in the sub-chassis 34, prevent any rattling in the directions of arrows A and B to ensure smooth movement in the direction of arrow K. This enables the front holder part 10, which is secured to the guides 30 and 31, to move also in the direction of arrow K. In other words, the front holder part 10 is movable only in the directions of arrows J and K while the rear holder part 20 is movable not only in the directions of arrows J and K but is movable also in the directions of arrows A and B.

The reason for arranging the front holder part 10 to be not movable in the directions of arrows A and B is as follows: The closing and opening members 15 and 12 for the shutter 4 are mounted on the front half 11 as mentioned in the foregoing. Therefore, if the front holder part 10 is arranged to move in the direction of arrow A together with the cassette 2 when the cassette is inserted, the shutter opening claw 12a would move at the same speed as the cassette 2. Then, it would be impossible to open the shutter 4. Likewise, in case of unloading, the shutter opening claw 15c would move at the same speed as the cassette 2 in the direction of arrow B and then it would also be impossible to close the shutter 4. Whereas, arrangement to have the front holder part 10 move at a speed different from that of the cassette 2 makes it possible to open and close the shutter 4. However, this arrangement becomes complex. This embodiment solves this problem by arranging the front holder plate 10 immovable in the directions of arrows A and B. The arrangement permits simplification of structural arrangement and reduction in the cost of manufacture.

In loading the cassette 4 by rotating the motor 37, the gear train of FIG. 3A continues to turn even after the pins 21a have moved along the slot 62a. The pins 21a descend in the direction of K along the slots 62b and come to a stop at the lower edges of these slots 62b. Meanwhile, the gear train further turns. The motor stopping switch which is not shown then comes to operate when the spring 60 is completely charged. The motor 37 then comes to a stop. FIG. 3C shows this condition. The pins 21a are urged in the direction of arrow K by the urging forces of the springs 60. Therefore, the springs 19 and 29 urge the cassette 2 to move downward within the apparatus body 90. In the case of the conventional apparatus, a resilient spring is disposed in a position approximately corresponding to the springs 19 and 29 and the engaging part 26c of the engaging member 26. However, the conventional spring is arranged to cause a positioning member, which is arranged for the purpose of setting a datum plane, to have the reverse side of the cassette 2 come to abut thereon. Whereas in the case of this specific embodiment, no resilient spring is arranged in the neighborhood of the engaging part 26c. The cassette 2 is urged by an urging force of the spring 25 exerted on the engaging member 26 in the direction of arrow I without having any additional spring. Therefore, in accordance with the arrangement of this embodiment, the cassette 2 can be surely loaded without recourse to the pushing force of an additional resilient spring.

The cassette holder part of the embodiment described above is based on U.S. patent application by Uehara et al. entitled "Recording and/or Reproducing Apparatus", assigned to the same assignee and filed on the same date as the present application.

Since the cassette holder part is divided into the front and rear holder parts 10 and 20, the holder part can be assembled much easier than the conventional apparatus. More specifically, at the last stage of assembly work, the front holder part 10 excluding the guides 30 and 31 is first mounted in position as shown in FIG. 1; and, after that, the guides 30 and 31 and the front half are mounted by means of screws through the facing screw holes 11c. Further, the arrangement to have the front holder part 10 immovable in the directions of arrows A and B enables the shutter opening and closing device including the closing member 15, the opening member 12, etc. to be secured to the part 10, so that the shutter operating device can be simply arranged. However, the support means for supporting the stabilizer plate raising-and-lowering and center core pressing mechanism, which represents a main feature of this invention, is applicable also to an apparatus having a cassette holder part or loading arrangement or device different from the one mentioned above.

The operation of the stabilizer plate raising-and-lowering and center core pressing mechanism 70, which embodies by way of example the main feature of this invention, is as follows: When there obtains the state of FIG. 3B, the loading motor 37 begins to operate as mentioned in the foregoing. The spur gear 50 is driven by the engagement of the gear train to turn counterclockwise. This causes the pin 50a and the roller 51 to turn. Then, after the state of FIG. 3B, the cam slot 52a of the lever 52 allows the lever 52 to turn clockwise on the shaft 54. With the lever 52 beginning to turn clockwise (see FIG. 3C), the stabilizer plate moving lever 53, which has been urged by the other end 56b of the spring 56 to move toward the lever 52, comes to turn counterclockwise on the shaft 73 as shown in FIG. 4A. Then, the pin 72a, which is provided at the fore end of the lever 72, also turns counterclockwise.

The lever 76 is at first kept in the state of FIG. 4A. However, since the slot 76f of the lever 76 is in fitting engagement with the pin 72a, the lever 76 comes to turn clockwise on the shaft 75 accordingly as the pin 72a moves in the direction of arrow K and also comes to descend in the direction of arrow K. The descent of the lever 76 causes the forked fore end part of the center core pressing member 79 to push the center core 3 of the magnetic disc onto the spindle 92. The toggle spring 82 is arranged to have two stabilized positions, including a first stable position as shown in FIG. 4A and a second stable position as shown in FIG. 4B. During the pressing operation of the center core pressing member 79, the toggle spring 82 is in the first stable position as long as the reaction of the center core 3 does not come to exceed a certain limit to keep the pressing member 79 in a position relative to the lever 81 as shown in FIG. 4A. When the reaction exceeds the above-stated limit, however, the toggle spring 82 shifts to the second position as shown in FIG. 4B. The pressing member 79 then turns relative to the lever 81 and escapes in a direction different from the above-stated pressing direction, for example, in a direction opposite to the pressing direction. FIG. 4B shows a loading completed state of the embodiment. The pressing member 79 stays away from the magnetic disc 1 during a recording or reproducing operation to impose no unnecessary load on the disc rotating motor 91. Thus, the center core 3 of the magnetic disc 1 is pressed and fitted on the spindle 92 without fail. In unloading the cassette 2, the pressing member 79, which is in the above-stated escaped position, turns counterclockwise together with the lever 76. During the counterclockwise motion, the member 79 comes into contact with the frame 71. The toggle spring 82 comes back to the first stable position. The pressing member 79 then comes to turn clockwise on the shaft 80 relative to the lever 81. The embodiment thus comes back to the state as shown in FIG. 4A.

Under the condition as shown in FIG. 4B, a switch, which is not shown, operates to bring the loading motor 37 to a stop. The disc rotating motor 91 and the stepping motor 66 (FIG. 1) begin to rotate. The magnetic disc 1 rotates. The driving force of the stepping motor 66 causes the magnetic head 94 to have access to a selected recording track on the magnetic disc 1. A recording or reproducing operation is performed. For this operation, the stabilizer plate 74 comes down to a position in which the plate 74 is either in contact with the rotary magnetic disc 1 or is opposed to the disc 1 across an air layer of a predetermined thickness, so that they can be kept in a desired contacting or confronting state. In this instance, the height of the stabilizer plate 74 relative to the disc 1 is adjustably defined by means of the screw 77 which is mounted on the lever 76 and is abutting on the fore end of the fixed shaft 91a of the motor 91.

In the stabilizer plate raising-and-lowering and center core pressing mechanism 70 shown in FIG. 4A, the stabilizer plate 74 and the center core pressing member 79 are supported in common by the lever 76. Therefore, these different parts can be assembled in one unit. This is highly advantageous for assembly work. Another advantage lies in that: For example, with these parts mounted on the frame 71 of the apparatus body, adjustment, called "head-touch" adjustment, can be carried out on them on the side of the apparatus body and then the parts thus adjusted can be mounted as they are on the side of the loading device. This not only simplifies the assembly work on the apparatus but also improves the accuracy of the pressed position of the center core. Variations in the core pressing force also can be lessened. Further, with the center core pressing member 79 and the stabilizer plate 74 both supported by the lever 76 and thus mounted on the side of the apparatus body, the center core pressing member 79 operates accordingly as the stabilizer plate 74 ascends or descends. This arrangement effectively prevents the load on the motor from increasing.

Finally, the unloading operation of the apparatus described above is described as follows: The loading motor 37 comes to rotate in a direction reverse to the rotation for loading in response to an operation such as pushing an eject key or the like, which is not shown. The lever 76 then turns counterclockwise on the shaft 75. During the counterclockwise turning of lever 76, the action of the toggle spring 82 brings the pressing member 79 back to its position relative to the lever 81 as shown in FIG. 4A. Meanwhile, the rear holder part 20 and the front holder part 10 move upward in the direction of arrow J as shown in FIGS. 1 and 3A. The rear holder part 20 then moves in the direction of arrow B to enable the cassette 2 to be taken out to the outside of the apparatus. When the rear holder part 20 comes back to the position of the disengaging member 28 shown in FIGS. 1 and 2, the member 28 causes the engaging member 26 to disengage from the positioning hole 5a. When the cassette 2 reaches a predetermined point, a switch, which is not shown, operates to bring the loading motor 37 to a stop. The unloading operation then comes to an end.

In accordance with this invention as mentioned in the foregoing, the apparatus is provided with the stabilizing means for stabilizing the rotation of the record bearing medium; the center core pressing means for pressing or pushing the center core, which is secured to the medium, against or onto the rotary drive part; and the common support means for supporting, in common, the stabilizing means and the center core pressing means. The invention thus permits unitizing assembly work on the stabilizing means and the center core pressing means. This permits reduction in size of the apparatus and simplification of assembly work.

If the above-stated carrying means is mounted on the side of the apparatus body, an operating device for the stabilizing means and the center core pressing means, which have undergone the head touch adjustment, can be mounted on the side of the cassette loading device. With the apparatus arranged in that manner, the accuracy of the pressed position of the center core can be increased and variations in the pressing force can be eliminated or at least can be lessened.

While a specific embodiment of the invention has been shown and described in detail to illustrate the application of the inventive principles, it will be understood that the invention may be embodied otherwise without departing from such principles.

What is claimed is:

1. A recording and/or reproducing apparatus using a disc shaped flexible record bearing medium having a mounting part, comprising:
   (a) rotation means for rotating said medium, said medium being mountable at the mounting part thereof on said rotation means;
   (b) pressing means for pressing the mounting part of the medium to mount the medium on said rotation means;
   (c) a head for recording and/or reproducing signals on or from the medium;
   (d) stabilizing means for stabilizing at least a portion of the medium when the medium is rotated by said rotation means, said stabilizing means being located on a side of said medium opposite to said head so as to stabilize an opposing state of the head to the medium;
   (e) movable support means common to said pressing means and to said stabilizing means;
   (f) an operation mechanism for operating said pressing means and said stabilizing means, said operation mechanism being operatively connected with said support means, and said operation mechanism acting on said support means according to the mounting of said medium to activate both the pressing means and the stabilizing means; and
   (g) means for separating the pressing means from the mounting part of the medium under a state in which the mounting of the medium on said rotation means has been completed.

2. The apparaptus according to claim 1, further comprising:
   a loading mechanism for loading the medium at a predetermined loading position within the apparatus,
   said operation mechanism being operatively associated with said loading mechanism for operating said pressing means and said stabilizing means in response to the loading of the medium.

3. The apparatus according to claim 2, wherein said loading mechanism includes:
   first and second holder means for holding the medium, said first and second holder means being spaced apart from each other and movable to load the medium at said predetermined position,
   said pressing means and said stabilizing means being disposed between said first and said second holder means.

4. The apparatus according to claim 1, further comprising:
   positioning means for positioning said stabilizing means relative to the medium, said positioning means being provided on said support means.

5. The device according to claim 4, wherein said positioning means is adjustable relative to said support means to adjust the position of the stabilizing means relative to the medium.

6. A recording and/or reproducing apparatus using a disc shaped flexible record bearing medium having a center core and housed in a cassette, said cassette having a pair of windows opposed to each other, said apparatus comprising:
   (a) a loading mechanism for loading the cassette at a predetermined position for signal recording and/or reproduction;
   (b) a spindle driven by a motor and engageable with the center core of the medium;
   (c) a pressing member for pressing the center core of the medium to engage the center core with said spindle;
   (d) a head for recording signals on and/or reproducing signals from the medium, said head being arranged to gain access to the medium through a first one of said windows of the cassette;
   (e) a stabilizing member for stabilizing the medium relative to said head when the medium is rotated by said spindle, said stabilizing member being arranged to gain access to the medium through a second one of said windows of the cassette;
   (f) a movable support member common to said pressing member and said stabilizing member;
   (g) an operation mechanism for operating said pressing member and said stabilizing member, said operation mechanism being operatively connected with said support member, and said operation mechanism acting on the support member according to the loading of the cassette by the loading mechanism to shift both the pressing member and the stabilizing member: and
   (h) means for separating the pressing member from the center core of the medium under a state in which the mounting of the medium on said spindle has been completed.

7. The apparatus according to claim 6, wherein said operation mechanism is operatively associated with said loading mechanism for operating said pressing member and said stabilizing member in response to the loading of the cassette.

8. The apparatus according to claim 7, wherein said loading mechanism includes:
a first and a second holders for holding said cassette, said holders being spaced apart from each other and movable to load the cassette at said predetermined position,
said support member, said pressing member and said stabilizing member being disposed between said first and second holders.

9. The apparatus according to claim 6, wherein said loading mechanism includes:
a first and a second holders for holding said cassette, said holders being spaced apart from each other and movable to load the cassette at said predetermined position,
said support member, said pressing member and said stabilizing member being disposed between said first and second holders.

10. The apparatus according to claim 6, further comprising:
a positioning member provided on said support member for positioning said stabilizing member relative to the medium.

11. The apparatus according to claim 10, wherein said positioning member is adjustable relative to said support member to adjust the position of said stabilizing member relative to the medium.

12. The apparatus according to claim 11, wherein said spindle is rotatable about a fixed shaft having a top surface,
said positioning member being engageable with the top surface of said shaft to position said stabilizing member relative to the medium.

13. The apparatus according to claim 10, wherein said spindle is rotatable about a fixed shaft having a to surface,
said positioning member being engageable with the top surface of said shaft to position said stabilizing member relative to the medium.

* * * * *